United States Patent
Dimson et al.

(10) Patent No.: US 11,688,072 B2
(45) Date of Patent: Jun. 27, 2023

(54) SYSTEMS AND METHODS FOR PROCESSING CONTENT

(71) Applicant: Meta Platforms, Inc., Menlo Park, CA (US)

(72) Inventors: Thomas Frederick Dimson, Palo Alto, CA (US); Ian McIntyre Silber, San Francisco, CA (US); Ryan Keenan Olson, Aspen, CO (US)

(73) Assignee: Meta Platforms, Inc., Menlo Park, CA (US)

( * ) Notice: Subject to any disclaimer, the term of this patent is extended or adjusted under 35 U.S.C. 154(b) by 175 days.

(21) Appl. No.: 17/180,499

(22) Filed: Feb. 19, 2021

(65) Prior Publication Data
US 2021/0248750 A1    Aug. 12, 2021

Related U.S. Application Data

(63) Continuation of application No. 16/235,352, filed on Dec. 28, 2018, now Pat. No. 10,929,979.

(51) Int. Cl.
| | |
|---|---|
| *G06T 7/11* | (2017.01) |
| *H04N 21/431* | (2011.01) |
| *G06V 40/10* | (2022.01) |
| *G06V 40/16* | (2022.01) |
| *G06V 10/46* | (2022.01) |
| *G06V 20/40* | (2022.01) |

(52) U.S. Cl.
CPC .............. *G06T 7/11* (2017.01); *G06V 10/462* (2022.01); *G06V 20/40* (2022.01); *G06V 40/103* (2022.01); *G06V 40/161* (2022.01); *H04N 21/431* (2013.01); *G06T 2207/20132* (2013.01)

(58) Field of Classification Search
None
See application file for complete search history.

(56) References Cited

U.S. PATENT DOCUMENTS

| | | | |
|---|---|---|---|
| 2019/0139282 A1* | 5/2019 | Rathore | ................ G06V 10/50 |
| 2019/0266980 A1 | 8/2019 | Kast et al. | |
| 2020/0020071 A1 | 1/2020 | Frey et al. | |

\* cited by examiner

*Primary Examiner* — Leon Flores
(74) *Attorney, Agent, or Firm* — Sheppard Mullin Richter & Hampton LLP

(57) ABSTRACT

Systems, methods, and non-transitory computer-readable media can determine a landscape video to be presented in a vertical orientation through a display screen of a computing device. Frames of the landscape video can be cropped to allow for full screen presentation of the landscape video in the vertical orientation. The cropped frames of the landscape video can be provided for presentation through the display screen of the computing device in the vertical orientation.

20 Claims, 10 Drawing Sheets

SYSTEMS AND METHODS FOR PROCESSING CONTENT

CROSS-REFERENCE TO RELATED APPLICATIONS

This application is a continuation of U.S. patent application Ser. No. 16/235,352, filed on Dec. 28, 2018 and entitled "SYSTEMS AND METHODS FOR PROCESSING CONTENT", which is incorporated in its entirety herein by reference.

FIELD OF THE INVENTION

The present technology relates to the field of content processing. More particularly, the present technology relates to techniques for cropping video content.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform.

SUMMARY

Various embodiments of the present disclosure can include systems, methods, and non-transitory computer readable media configured to determine a landscape video to be presented in a vertical orientation through a display screen of a computing device. Frames of the landscape video can be cropped to allow for full screen presentation of the landscape video in the vertical orientation. The cropped frames of the landscape video can be provided for presentation through the display screen of the computing device in the vertical orientation.

In an embodiment, cropping frames of the landscape video to allow for full screen presentation of the landscape video in the vertical orientation further comprises determining a region to be cropped for at least one frame of the landscape video based on at least one predefined object being detected in the at least one frame.

In an embodiment, the region to be cropped encompasses the at least one predefined object.

In an embodiment, the at least one predefined object corresponds to a person or a human face.

In an embodiment, cropping frames of the landscape video to allow for full screen presentation of the landscape video in the vertical orientation further comprises determining at least a first object and a second object represented in at least one frame of the landscape video, determining that the first object is in an active state, and determining a region to be cropped for the at least one frame based on the first object being in an active state.

In an embodiment, the first object corresponds to a first human face and the second object corresponds to a second human face, and wherein the first object is determined to be in an active state based on a determination that the first human face is speaking.

In an embodiment, the first object corresponds to a first person and the second object corresponds to a second person, and wherein the first object is determined to be in an active state based on a determination that the first person is speaking at a rate faster than the second person.

In an embodiment, the first object is determined to be in an active state based on a determination that the first object is performing some predefined activity.

In an embodiment, cropping frames of the landscape video to allow for full screen presentation of the landscape video in the vertical orientation further comprises determining a region to be cropped for at least one frame of the landscape video based on saliency information determined for the at least one frame.

In an embodiment, the saliency information identifies a most salient portion of the at least one frame.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
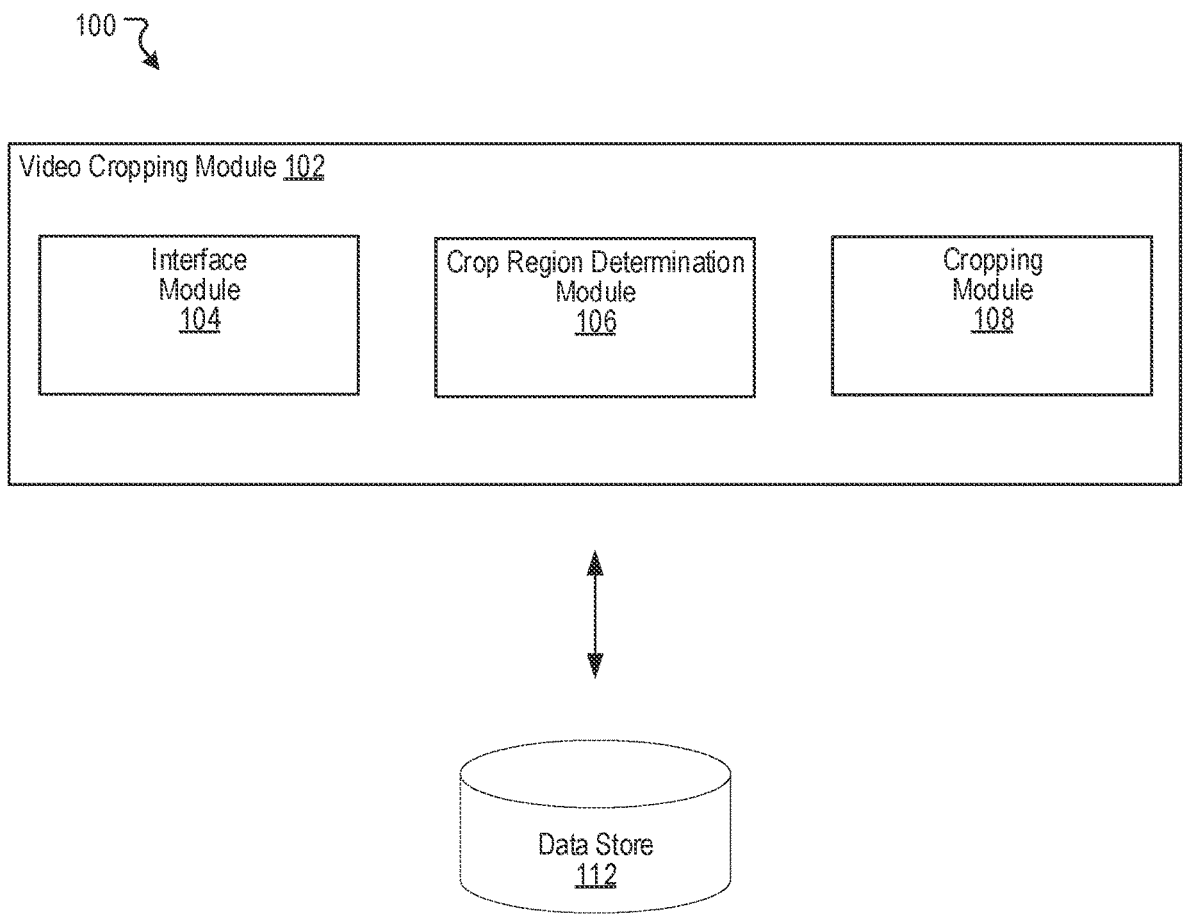
FIG. 1 illustrates an example system including an example video cropping module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Processing Content

People use computing devices (or systems) for a wide variety of purposes. As mentioned, under conventional approaches, a user can utilize a computing device to share content items (e.g., documents, images, videos, audio, etc.) with other users. Such content items can be made available through a social networking system. Users can operate their computing devices to access the content items through the platform. Typically, the content items can be provided, or uploaded, by various entities including, for example, content publishers and also users of the social networking system.

Under conventional approaches, users can create videos in a horizontal orientation (e.g., landscape video) or in a vertical orientation (e.g., vertical video). In general, landscape videos typically have aspect ratios that provide for optimal viewing on widescreen display screens having similar aspect ratios (e.g., 16:9, 18:9, 21:9, etc.). However, landscape videos generally provide a subpar viewing experience on display screens having aspect ratios that are adapted for displaying content vertically (e.g., display screens in mobile devices). For example, a display screen in a mobile device may have an aspect ratio that is better suited for displaying content vertically (e.g., 9:16, 9:18, etc.). In this example, when viewing a landscape video through a display screen of a mobile device, a user typically has to rotate the display screen to a horizontal orientation to fully view the landscape video. If the display screen is not rotated and remains in a vertical orientation, then the landscape video is typically presented with borders that are needed to fill a top portion and a bottom portion of the display screen. Such limitations typically associated with landscape videos can discourage users from accessing and sharing content, especially when those users prefer to view content using computing devices that are designed to display content vertically.

An improved approach rooted in computer technology overcomes the foregoing and other disadvantages associated with conventional approaches specifically arising in the realm of computer technology. In various embodiments, landscape videos can be cropped for presentation as vertical videos. In an embodiment, a landscape video can be cropped for presentation as a vertical video based on objects that are detected in the landscape video. For example, a portion of the landscape video in which a human face is represented can be cropped for presentation as a vertical video. In another embodiment, a landscape video can be cropped for presentation as a vertical video based on salient features detected in the landscape video. For example, a salient portion of a landscape video in which a person surfing in the ocean is represented can be cropped for presentation as a vertical video. As a result, landscape videos can be cropped for vertical presentation based on content deemed to be relevant to users. Moreover, cropped landscape videos can be presented in full screen through display screens having aspect ratios that are typically suited for viewing content in a vertical orientation (e.g., 9:16, 9:18, etc.). More details relating to the disclosed technology are provided below.

FIG. 1 illustrates an example system 100 including an example video cropping module 102, according to an embodiment of the present disclosure. As shown in the example of FIG. 1, the video cropping module 102 can include an interface module 104, crop region determination module 106, and a cropping module 108. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the video cropping module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the video cropping module 102 or at least a portion thereof can be implemented using one or more computing devices or systems that include one or more servers, such as network servers or cloud servers. In some instances, the video cropping module 102 can, in part or in whole, be implemented within or configured to operate in conjunction with a social networking system (or service), such as the social networking system 630 of FIG. 6. In some instances, the video cropping module 102 can be, in part or in whole, implemented within or configured to operate in conjunction or be integrated with a client computing device, such as the user device 610 of FIG. 6. For example, the video cropping module 102 can be implemented as or within a dedicated application (e.g., app), a program, or an applet running on a user computing device or client computing system. The application incorporating or implementing instructions for performing some, or all, functionality of the video cropping module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The video cropping module 102 can be configured to communicate and/or operate with the at least one data store 112, as shown in the example system 100. The at least one data store 112 can be configured to store and maintain various types of data. For example, the data store 112 can store information describing various content that has been shared by users of a social networking system. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

In various embodiments, the interface module 104 can be configured to provide an interface (e.g., graphical user interface, application programming interface) that provides options for cropping videos among other types of content items (e.g., images, live content streams, etc.). For instance, the interface module 104 can provide an option to upload a video (e.g., a landscape video) to be cropped. The interface module 104 can also provide options for cropping videos based on subject matter represented in the videos. For example, in an embodiment, the interface module 104 can provide an option to crop frames of a video based on one or more predefined objects detected in the frames. In another embodiment, the interface module 104 can provide an option to crop frames of a video based on saliency information determined for the video. In various embodiments, once a cropping option is selected for a video, some or all frames of the video can be cropped based on the selected cropping option. In some embodiments, the interface module 104 can include an option to specify an aspect ratio based on which regions of a given video will be cropped. For example, an aspect ratio suited for presenting videos vertically can be defined (e.g., 9:16, 9:21, etc.). The defined aspect ratio can be used to determine a size of a region to be cropped from frames to facilitate vertical presentation of a video.

The crop region determination module 106 can determine regions of videos to be cropped for vertical presentation. The regions to be cropped may be determined based on a cropping option selected through the interface 104. For example, a user may upload a landscape video and select an option to crop frames of the landscape video based on a specified object being represented in the frames (e.g., a human face, an animal, a basketball, etc.). More details regarding the crop region determination module 106 will be provided below with reference to FIG. 2.

The cropping module 108 can apply generally known image cropping techniques to crop portions of videos. For example, in some embodiments, the cropping module 108 can be instructed to crop respective regions in one or more frames of a video. In such embodiments, the regions to be cropped can be identified by the crop region determination module 106. In some embodiments, the cropping module 108 can store cropped frames of a given landscape video for full screen presentation (or streaming) of the video in a vertical orientation.

Figure 2:
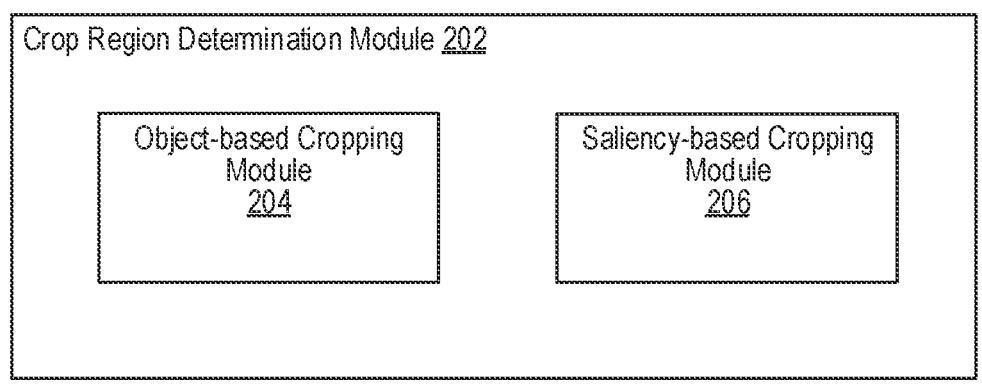
FIG. 2 illustrates an example crop region determination module, according to an embodiment of the present disclosure.

FIG. 2 illustrates an example crop region determination module 202, according to an embodiment of the present disclosure. The crop region determination module 202 can determine regions to be cropped from a landscape video to facilitate full screen presentation of the landscape video in a vertical format. In some embodiments, the crop region determination module 106 of FIG. 1 can be implemented with the crop region determination module 202. As shown in the example of FIG. 2, the crop region determination module 202 can include an object-based cropping module 204 and a saliency-based cropping module 206.

The object-based cropping module 204 can be configured to crop landscape videos for vertical presentation based on objects detected in the videos. For example, the object-based cropping module 204 can analyze frames of a landscape video to determine regions in which a predefined object is represented (e.g., a human face, an animal, a basketball, etc.). When the predefined object is detected in a given frame, the object-based cropping module 204 can determine a region that partially or fully encompasses the detected predefined object. For example, the object-based cropping module 204 can determine the region based on a center point of the detected predefined object. The object-based cropping module 204 can also determine a size of the region to be cropped from the frame based on an aspect ratio suited for vertical presentation (e.g., 9:16, 9:18, etc.). In some embodiments, the aspect ratio may be predefined or may be specified, for example, through an interface provided by the interface module 104 of FIG. 1. The determined region for the frame can then be cropped and saved to allow presentation of the video in a vertical orientation. In various embodiments, the object-based cropping module 204 can continually track and crop the predefined object across all frames of the video (or every nth frame of the video). For example, the object-based cropping module 204 can determine a region that partially or fully encompasses the predefined object in each subsequent frame of the video. The determined regions for each of the subsequent frames can then be cropped and saved to allow presentation of the video in a vertical orientation. In various embodiments, the object-based cropping module 204 can apply generally known object detection and tracking techniques when cropping regions in frames.

The object-based cropping module 204 can also be configured to crop landscape videos for vertical presentation based on multiple objects detected in the videos. That is, there may be multiple instances of a predefined object in a landscape video. In an embodiment, rather than determining a region to crop by arbitrarily selecting one of the multiple instances of the predefined object, the object-based cropping module 204 can determine a region to crop based on a predefined object being in an active state. For example, multiple persons may be represented in frames of a landscape video. In this example, the object-based cropping module 204 can determine which of the multiple persons is in an active state. Once a person is determined to be in an active state, the object-based cropping module 204 can determine a region that partially or fully encompasses the active person. In an embodiment, a person is determined to be in an active state when speaking. In an embodiment, if multiple people are determined to be speaking in a given frame, the person speaking at a faster rate of speed can be determined to be in an active state. Other approaches for identifying active objects are possible. For example, an object may be deemed active when performing some activity (e.g., running, hitting or shooting a ball, waving, dancing, etc.). In general, the object-based cropping module 204 can apply generally known image processing techniques (e.g., lip detection, gaze detection, etc.) to make such determinations.

The saliency-based cropping module 206 can be configured to crop landscape videos for vertical presentation based on saliency information determined for the videos. In various embodiments, the saliency-based cropping module 206 can apply a saliency prediction model to determine regions to be cropped from frames of a given video. More details regarding the saliency-based cropping module 206 will be provided below with reference to FIG. 3.

Figure 3:
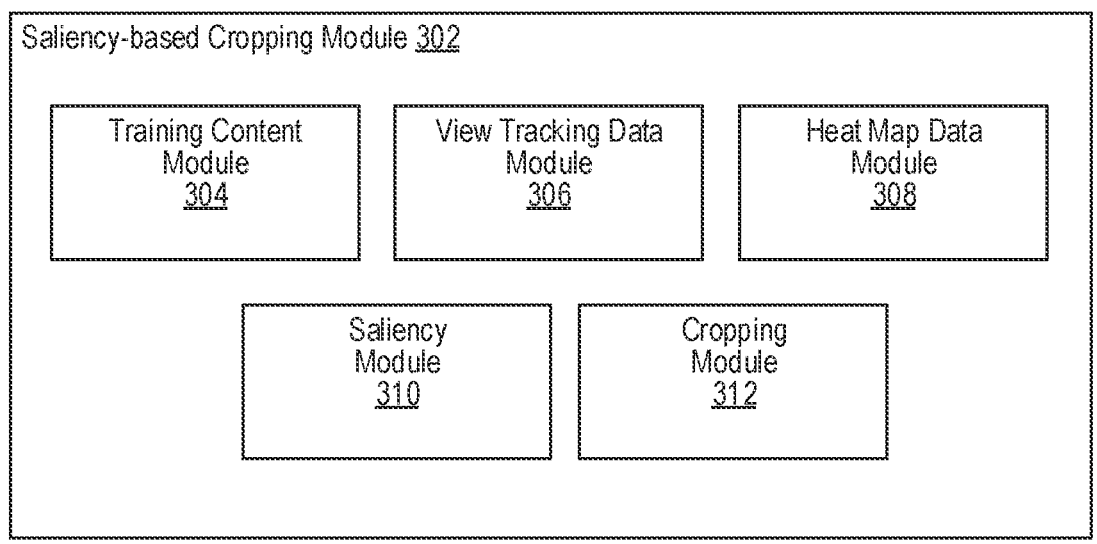
FIG. 3 illustrates an example saliency-based cropping module, according to an embodiment of the present disclosure.

FIG. 3 illustrates an example of a saliency-based cropping module 302, according to an embodiment of the present disclosure. In some embodiments, the saliency-based cropping module 206 of FIG. 2 can be implemented with the saliency-based cropping module 302. As shown in the example of FIG. 3, the saliency-based cropping module 302 can include a training content module 304, a view tracking data module 306, a heat map data module 308, a saliency module 310, and a cropping module 312.

In various embodiments, the training content module 304 can be configured to obtain content items to be used for training one or more models (e.g., saliency prediction machine learning models). Such content items may include videos including, for example, landscape videos formatted in a horizontal orientation and vertical videos formatted in a vertical orientation.

In some embodiments, the view tracking data module 306 can be configured to obtain respective view tracking data for each of the content items being used to train the models. For example, view tracking data for a given content item may be collected for each user (or viewer) that has accessed the content item. The view tracking data for a user may identify regions that were accessed through the user's viewport during presentation of the content item. In some instances, the viewport can be associated with a computing device used to present the content item. Such view tracking data may be collected for each frame corresponding to the content item. In some embodiments, a user's view tracking data for a content item can be determined based on changes to the user's viewport during presentation of the content item. Such changes to the viewport may be measured using generally known approaches that can be used either alone or in combination. For example, changes to the viewport may be measured using sensor data (e.g., gyroscope data, inertial measurement unit data, etc.) that describes movement of the computing device being used to present the content item. In another example, changes to the viewport can be measured using gesture data describing the types of gestures (e.g., panning, zooming, etc.) that were performed during presentation of the content item. Another example approach for measuring changes to the viewport include using input device data that describes input operations (e.g., mouse movement, dragging, etc.) performed during presentation of the content item. In some embodiments, view tracking data can be determined based on other techniques, such as gaze detection. Many variations are possible.

In some embodiments, the heat map data module 308 can be configured to generate (or obtain) heat maps for each of the content items being used to train the models. In some embodiments, heat maps for a given content item may be generated based on view tracking data for the content item. As mentioned, the view tracking data module 306 can obtain respective view tracking data for users that viewed a content item. Each user's view tracking data can indicate which regions of a given frame (or set of frames) were accessed using a user's viewport during presentation of a content item. That is, for any given frame in the content item, the heat map data module 308 can generate (or obtain) user-specific heat maps that graphically represent regions in the frame that were of interest to a given user. In some embodiments, user-specific heat maps for a given content item can be combined to generate aggregated heat maps that represent aggregated regions of interest in frames corresponding to the content item. Thus, for example, the respective user-specific heat maps can be aggregated on a frame-by-frame basis so that each frame of the content item is associated with its own aggregated heat map that identifies the regions of interest in the frame. These regions of interest can correspond to various points of interest that appear in frames and were determined to be of interest to some, or all, of the users that viewed the content item.

In some embodiments, the saliency module 310 can be configured to train a saliency prediction model. In such embodiments, the saliency prediction model can be used to identify content (e.g., points of interest) that is likely to be of interest to users accessing a content item. For example, the saliency prediction model can determine that a first point of interest which appears in a given frame of a content item is likely to be of interest to users over a second point of interest that also appears in the frame. In some embodiments, the saliency prediction model is trained using the content items that were obtained by the training content module 304 and their respective aggregated heat maps. For example, in some embodiments, each frame of a content item and its corresponding aggregated heat map can be provided as a training example to the saliency prediction model. In some embodiments, the saliency prediction model is trained using aggregated heat map data that has been labeled to identify points of interest. Based on this information, the saliency prediction model can learn which pixels in the frame were interesting (or relevant) to users in the aggregate. In some embodiments, these pixels correlate to points of interest that appear in frames. As a result, the saliency prediction model can learn which points of interest appearing in a frame were of interest to users in the aggregate with respect to other points of interest that also appear in the frame. Once trained, the saliency prediction model can be used to identify content (e.g., points of interest) that is likely to be of interest in new content items. In some embodiments, the saliency prediction model can be used to predict salient points of interest for stored content items (e.g., videos). In some embodiments, the saliency prediction model can be used to predict salient points of interest (e.g., points of interest that are likely to be of interest) for live content items (e.g., live video broadcasts).

The cropping module 312 can be configured to crop landscape videos for vertical presentation based on saliency information. In various embodiments, the cropping module 312 can apply the saliency prediction model to determine regions to be cropped from frames of a given landscape video. In an embodiment, the saliency-based cropping module 206 can crop regions based on saliency information across all frames (or every nth frame) to facilitate vertical presentation of a video. In this embodiment, when a most salient portion (or most salient portions) of a given frame is determined, the saliency-based cropping module 206 can determine a crop region that partially or fully encompasses the most salient portion (or most salient portions). For example, the cropping module 312 can determine the region based on a center point of the most salient portion. The cropping module 312 can also determine a size of the region to be cropped from the frame based on an aspect ratio suited for vertical presentation (e.g., 9:16, 9:18, etc.). In some embodiments, the aspect ratio may be predefined or may be specified, for example, through an interface provided by the interface module 104 of FIG. 1. The region determined for the frame can then be cropped and saved to allow presentation of the landscape video in a vertical orientation. In various embodiments, the cropping module 312 can continually crop all frames of the video (or every nth frame of the video) based on saliency information. For example, the cropping module 312 can determine a region that partially or fully encompasses the most salient portion in each subsequent frame of the video. The determined regions for each of the subsequent frames can then be cropped and saved to allow presentation of the landscape video in a vertical orientation.

Figure 4A:
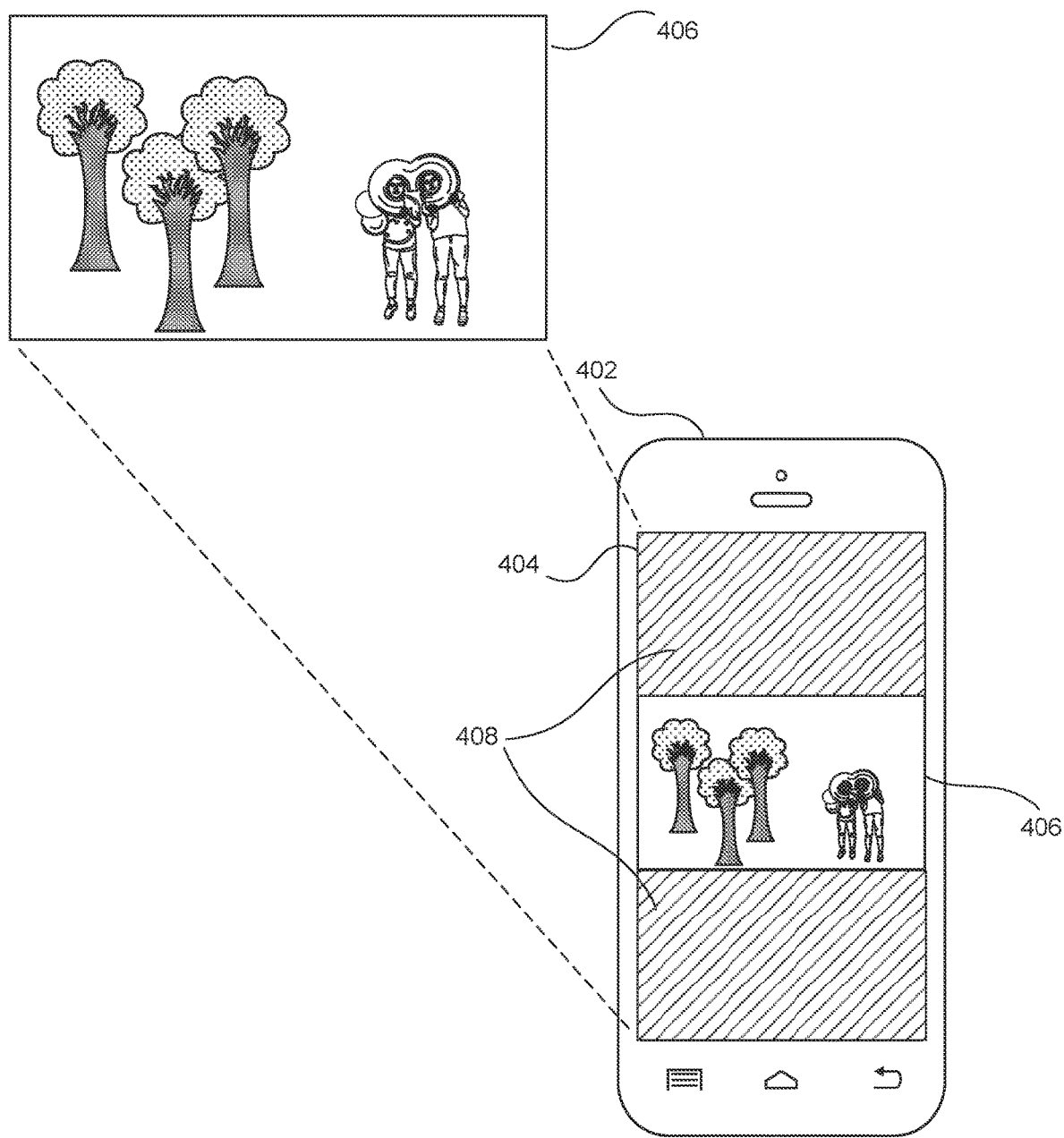
FIG. 4A illustrates an example diagram demonstrating presentation of a landscape video under conventional approaches.

FIG. 4A illustrates an example of a landscape video 406 being presented through a display screen 404 of a computing device 402. As shown, the display screen 404 is designed for displaying content in a vertical orientation. Thus, when the landscape video 406 is presented through the display screen 404, the landscape video 406 is shown with borders 408 which are needed to fill a top portion and a bottom portion of the display screen 404.

Figure 4B:
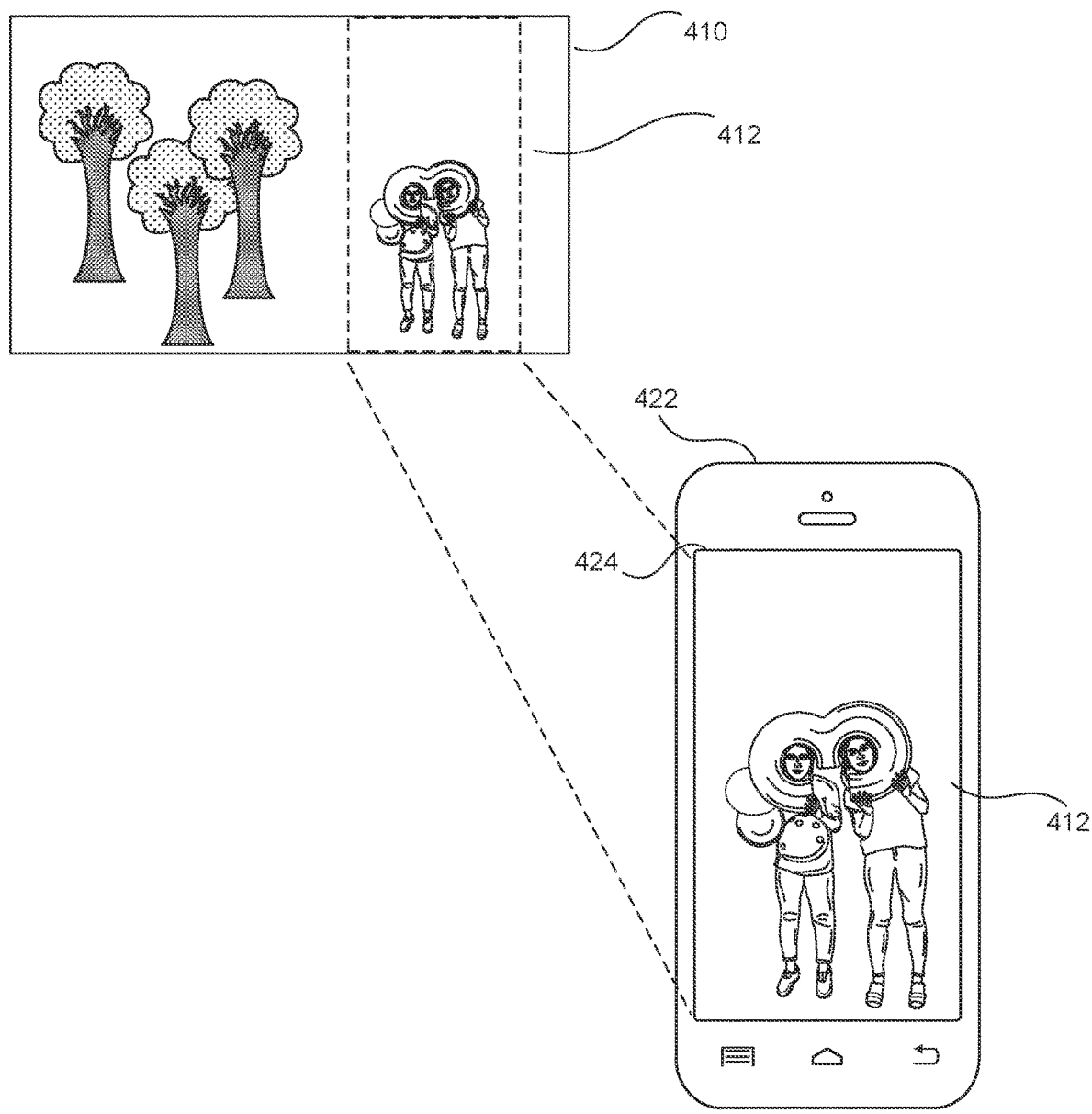
FIGS. 4B-4D illustrate example diagrams, according to an embodiment of the present disclosure.
Figure 4C:
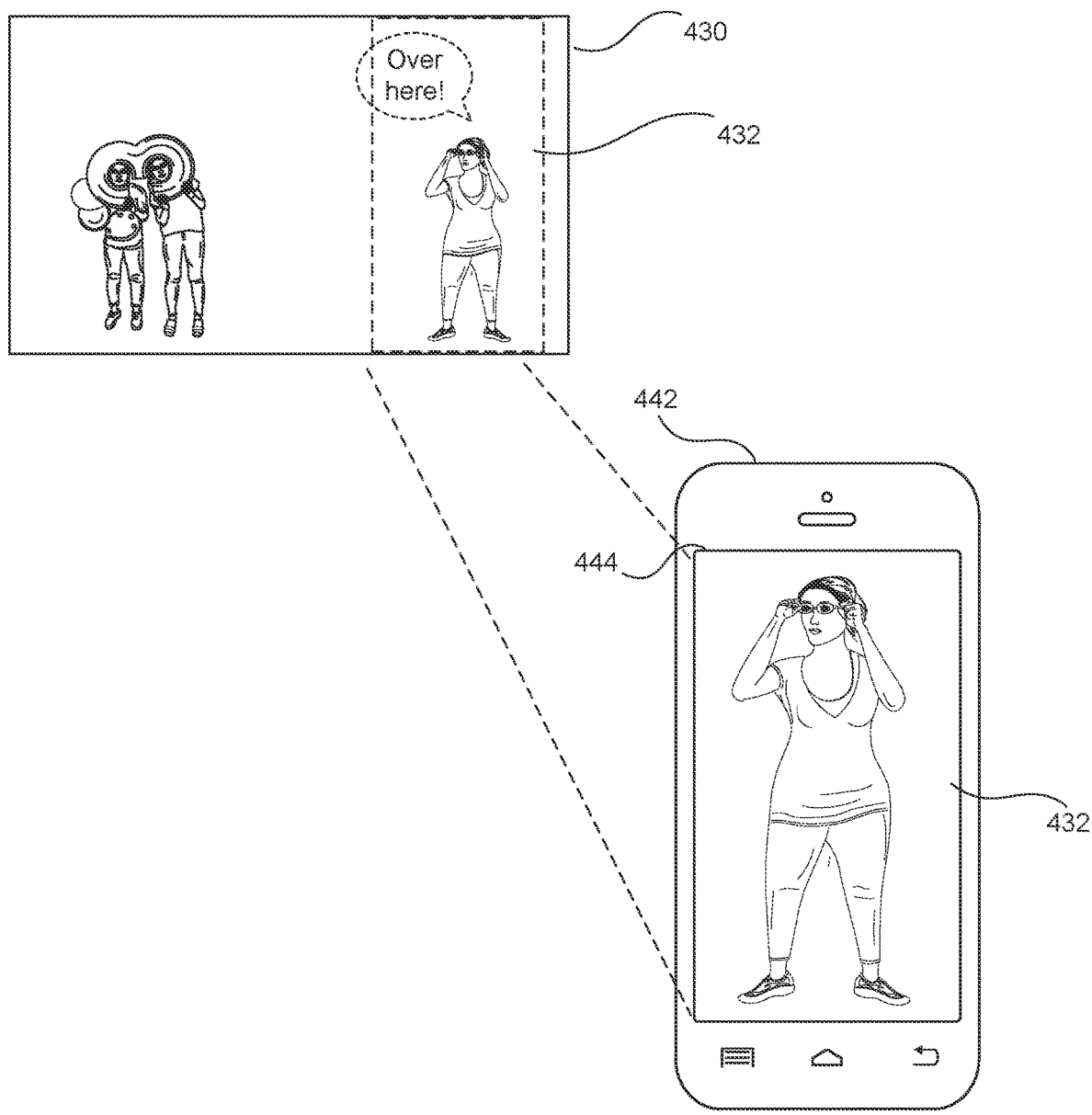
Figure 4D:
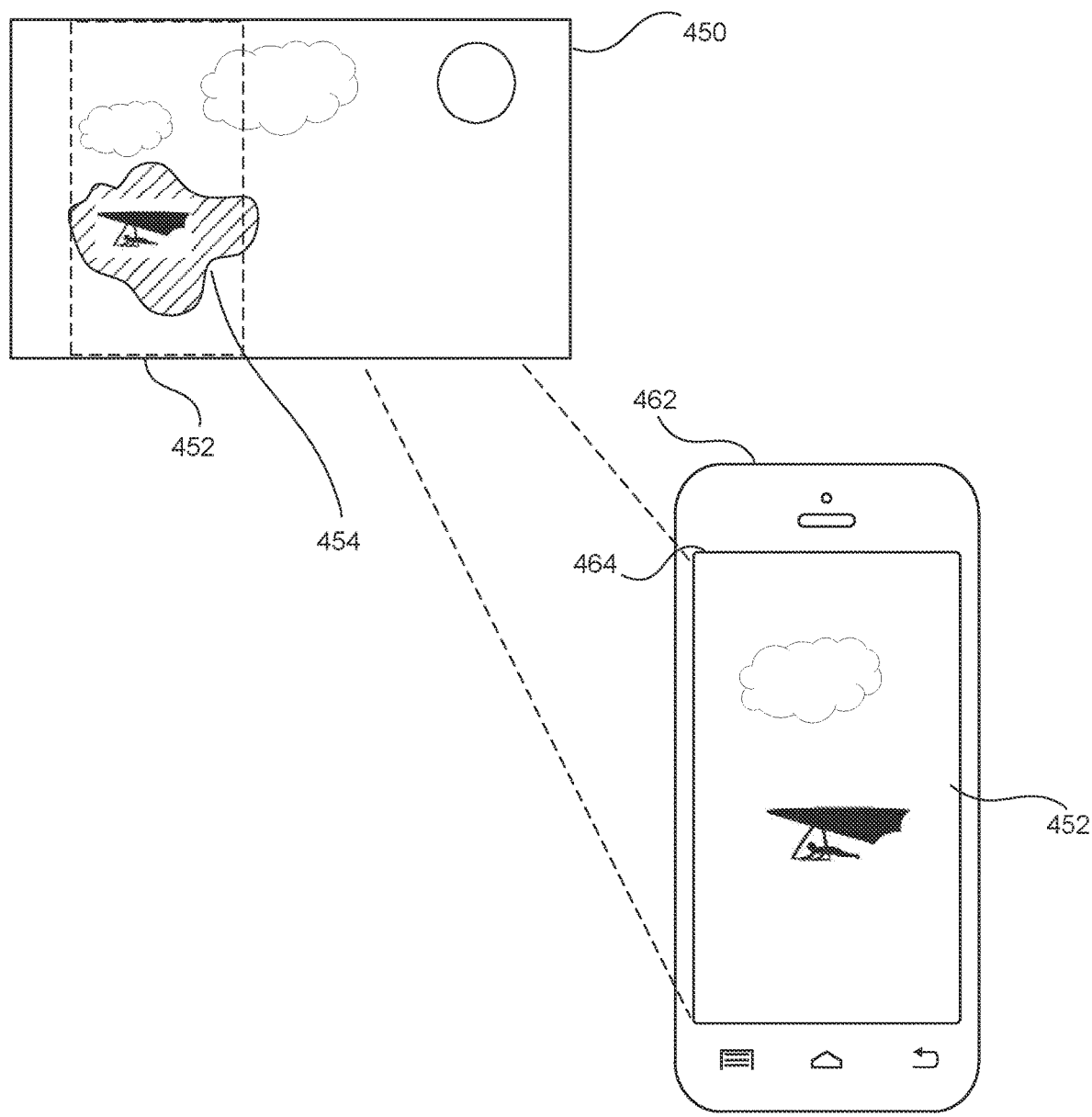

FIGS. 4B-4D illustrate presentation of landscape videos that have been cropped for vertical presentation based on the video cropping module 102, according to embodiments of the present disclosure. For example, FIG. 4B illustrates a region 412 of a landscape video 410 that has been cropped to facilitate vertical presentation of the landscape video 410. In this example, the region 412 has been cropped based on predefined objects (e.g., humans) being detected in the landscape video 410. The cropped region 412 can then be accessed in a full screen vertical orientation as shown in a display screen 424 of a computing device 422. FIG. 4C illustrates another application of a cropping technique to facilitate vertical presentation of a landscape video 430. In FIG. 4C, a region 432 of the landscape video 430 has been cropped to facilitate vertical presentation of the landscape video 430. In this example, the region 432 has been cropped based on detection of an active object (e.g., a person speaking) in the landscape video 430. The cropped region 432 can then be accessed in a full screen vertical orientation as shown in a display screen 444 of a computing device 442. FIG. 4D illustrates yet another application of a cropping technique to facilitate vertical presentation of a landscape video 450. In FIG. 4D, a region 452 of the landscape video 450 has been cropped to facilitate vertical presentation of the landscape video 450. In this example, the region 452 has been cropped based on saliency information identifying an object of interest 454. The cropped region 452 can then be accessed in a full screen vertical orientation as shown in a display screen 464 of a computing device 462.

Figure 5:
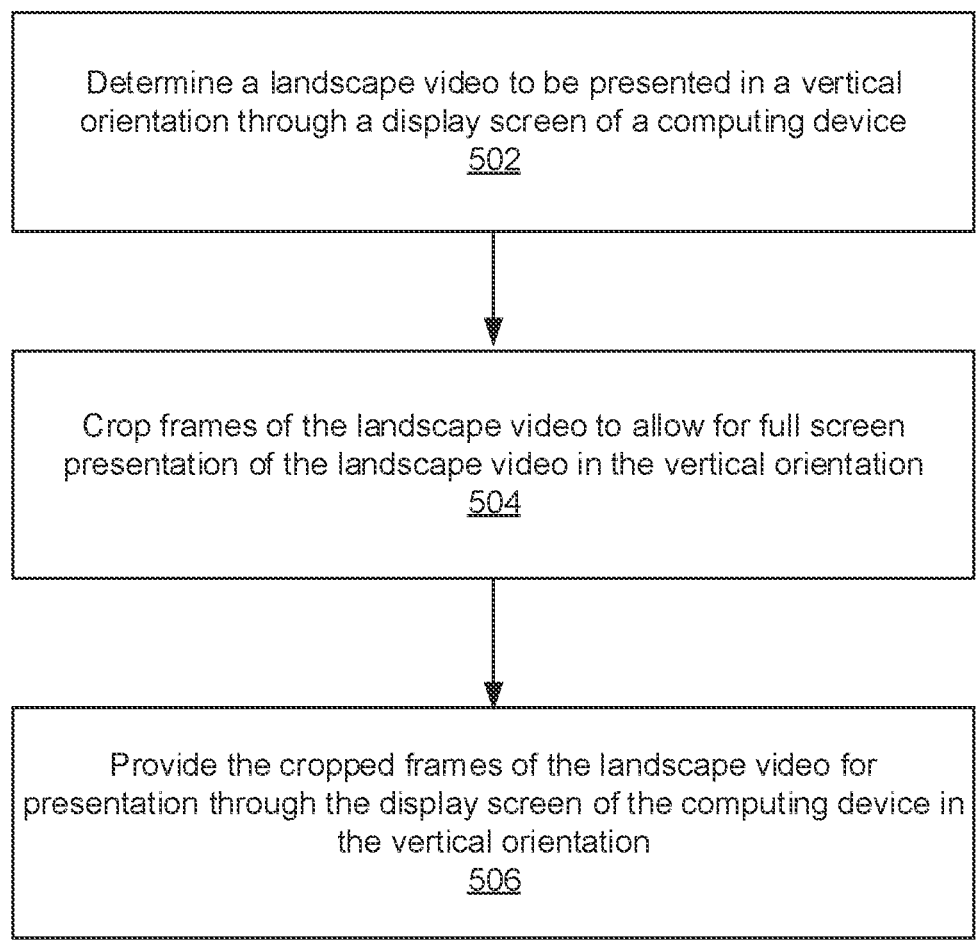
FIG. 5 illustrates an example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a landscape video to be presented in a vertical orientation through a display screen of a computing device can be determined. At block 504, frames of the landscape video can be cropped to allow for full screen presentation of the landscape video in the vertical orientation. At block 506, the cropped frames of the landscape video can be provided for presentation through the display screen of the computing device in the vertical orientation.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
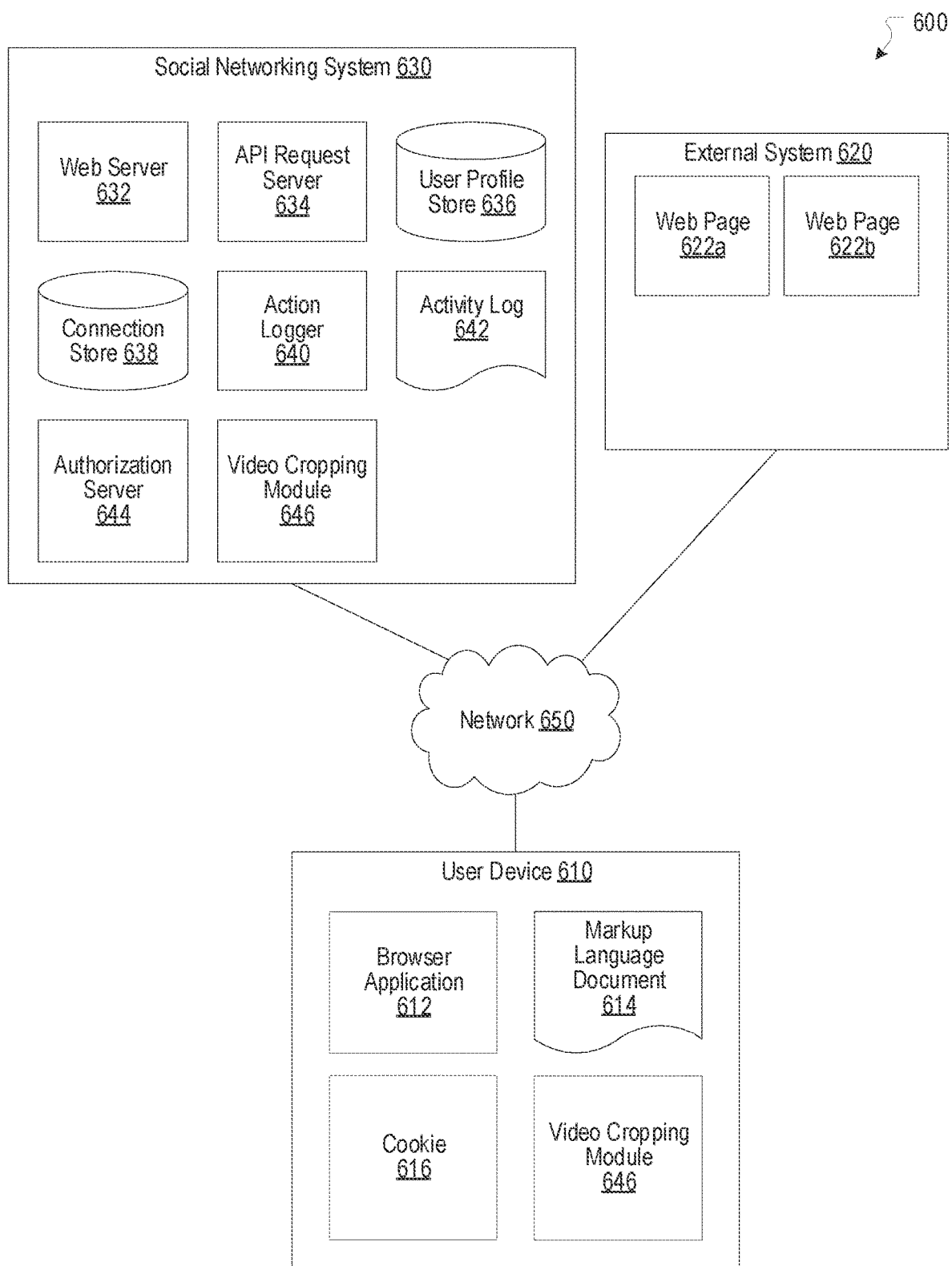
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a video cropping module 646. The video cropping module 646 can, for example, be implemented as the video cropping module 102 of FIG. 1. In some embodiments, the video cropping module 646, in whole or in part, is additionally or alternatively implemented in the user device 610. As discussed previously, it should be appreciated that there can be many variations or other possibilities.

Hardware Implementation

Figure 7:
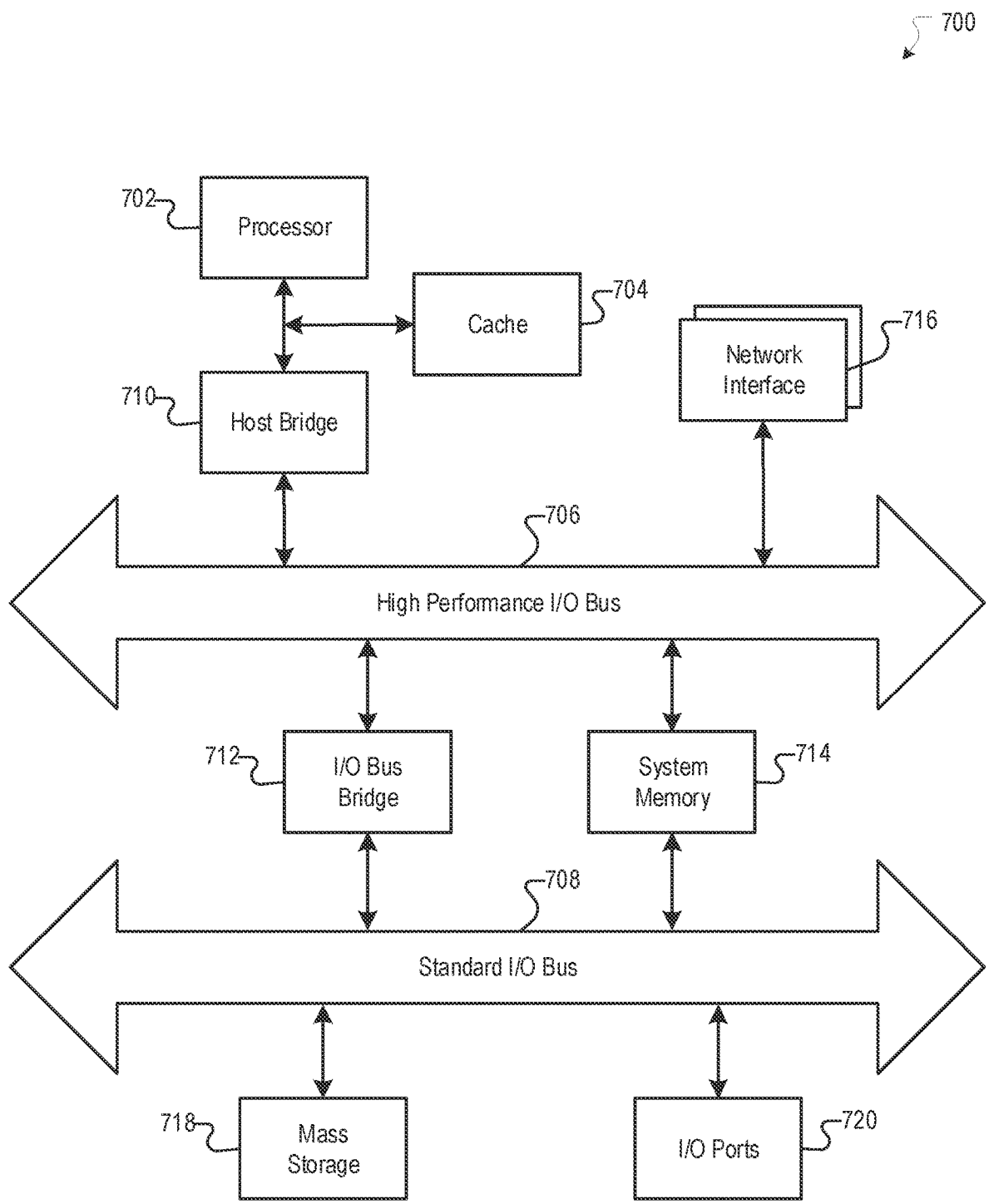
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   aggregating, by a computing system, heat map data for a plurality of content items, wherein the aggregated heat map data is generated based on view tracking data associated with a plurality of users who viewed the plurality of content items, wherein the aggregated heat map data generated based on view tracking data is associated with salient regions of the plurality of content items;
   generating, by the computing system, a plurality of training examples based on the aggregated heat map data, wherein a training example labels a frame of a content item based on the aggregated heat map data; and
   training, by the computing system, a saliency prediction model to identify salient regions in content items based on the plurality of training examples.

2. The computer-implemented method of claim 1, wherein view tracking data associated with a given content item identifies one or more regions of at least one frame of the given content item that were accessed through a viewport of at least one user.

3. The computer-implemented method of claim 2, wherein the one or more regions of the at least one frame of the given content item are identified based on changes to the viewport while the given content item is accessed, wherein the changes to the viewport are measured based on at least one of sensor data that describes movement of the viewport, gesture data that describes gestures performed, input device data that describes input operations performed, or gaze detection data.

4. The computer-implemented method of claim 1, wherein aggregating the heat map data further comprises:
   generating, by the computing system, the aggregated heat map data based on view tracking data associated with a user that viewed at least one of the plurality of content items.

5. The computer-implemented method of claim 1, wherein aggregating the heat map data further comprises:
   generating, by the computing system, the aggregated heat map data based on a combination of (i) respective view tracking data associated with a first user that viewed a first content item and (ii) respective view tracking data associated with a second user that viewed the first content item.

6. The computer-implemented method of claim 1, wherein aggregating the heat map data further comprises:
   generating, by the computing system, the aggregated heat map data based on a combination of (i) respective view tracking data associated with a first user that viewed a first content item and (ii) respective view tracking data associated with a second user that viewed a second content item.

7. The computer-implemented method of claim 1, wherein generating a training example further comprises:
   obtaining, by the computing system, aggregated heat map data associated with a first frame of a first content item; and
   associating, by the computing system, one or more labels with the aggregated heat map data associated with the first frame of the first content item, wherein a label identifies a point of interest that appears in the first frame of the first content item.

8. The computer-implemented method of claim 1, further comprising:
   determining, by the computing system, a salient region within at least one frame of an evaluated content item based on the trained saliency prediction model.

9. The computer-implemented method of claim 8, wherein determining the salient region further comprises:
   determining, by the computing system, that a first point of interest that appears in a frame of the evaluated content item is more likely to be of interest to users accessing the evaluated content item than a second point of interest that appears in the frame of the evaluated content item based on the trained saliency prediction model; and
   determining, by the computing system, the salient region based on the first point of interest.

10. The computer-implemented method of claim 8, wherein the evaluated content item corresponds to a stored video or a live video broadcast.

11. A system comprising:
    at least one processor; and
    a memory storing instructions that, when executed by the at least one processor, cause the system to perform:

aggregating heat map data for a plurality of content items, wherein the aggregated heat map data is generated based on view tracking data associated with a plurality of users who viewed the plurality of content items, wherein the aggregated heat map data generated based on view tracking data is associated with salient regions of the plurality of content items;

generating a plurality of training examples based on the aggregated heat map data, wherein a training example labels a frame of a content item based on the aggregated heat map data; and training a saliency prediction model to identify salient regions in content items based on the plurality of training examples.

12. The system of claim 11, wherein view tracking data associated with a given content item identifies one or more regions of at least one frame of the given content item that were accessed through a viewport of at least one user.

13. The system of claim 12, wherein the one or more regions of the at least one frame of the given content item are identified based on changes to the viewport while the given content item is accessed, wherein the changes to the viewport are measured based on at least one of sensor data that describes movement of the viewport, gesture data that describes gestures performed, input device data that describes input operations performed, or gaze detection data.

14. The system of claim 11, wherein aggregating the heat map data further causes the system to perform:

generating the aggregated heat map data based on view tracking data associated with a user that viewed at least one of the plurality of content items.

15. The system of claim 11, wherein aggregating the heat map data further causes the system to perform:

generating the aggregated heat map data based on a combination of (i) respective view tracking data associated with a first user that viewed a first content item and (ii) respective view tracking data associated with a second user that viewed the first content item.

16. A non-transitory computer-readable storage medium including instructions that, when executed by at least one processor of a computing system, cause the computing system to perform a method comprising:

aggregating heat map data for a plurality of content items, wherein the aggregated heat map data is generated based on view tracking data associated with a plurality of users who viewed the plurality of content items, wherein the aggregated heat map data generated based on view tracking data is associated with salient regions of the plurality of content items;

generating a plurality of training examples based on the aggregated heat map data, wherein a training example labels a frame of a content item based on the aggregated heat map data; and training a saliency prediction model to identify salient regions in content items based on the plurality of training examples.

17. The non-transitory computer-readable storage medium of claim 16, wherein view tracking data associated with a given content item identifies one or more regions of at least one frame of the given content item that were accessed through a viewport of at least one user.

18. The non-transitory computer-readable storage medium of claim 17, wherein the one or more regions of the at least one frame of the given content item are identified based on changes to the viewport while the given content item is accessed, wherein the changes to the viewport are measured based on at least one of sensor data that describes movement of the viewport, gesture data that describes gestures performed, input device data that describes input operations performed, or gaze detection data.

19. The non-transitory computer-readable storage medium of claim 16, wherein aggregating the heat map data further causes the computing system to perform:

generating the aggregated heat map data based on view tracking data associated with a user that viewed at least one of the plurality of content items.

20. The non-transitory computer-readable storage medium of claim 16, wherein aggregating the heat map data further causes the computing system to perform:

generating the aggregated heat map data based on a combination of (i) respective view tracking data associated with a first user that viewed a first content item and (ii) respective view tracking data associated with a second user that viewed the first content item.

* * * * *